United States Patent [19]
Kitai et al.

[11] 4,364,648
[45] Dec. 21, 1982

[54] SAFETY DEVICE OF AUTO-FOCUSING POINT ADJUSTING CAMERA

[75] Inventors: Kiyoshi Kitai; Yuzuru Takazawa, both of Chiba, Japan

[73] Assignee: Seiko Koki Kabushiki Kaisha, Japan

[21] Appl. No.: 973,808

[22] Filed: Dec. 28, 1978

[30] Foreign Application Priority Data

Dec. 29, 1977 [JP] Japan .............................. 52-159269

[51] Int. Cl.³ .............................................. G03B 7/08
[52] U.S. Cl. ........................................................ 354/25
[58] Field of Search ......................... 354/25, 195, 198

[56] References Cited

U.S. PATENT DOCUMENTS

| | | | |
|---|---|---|---|
| 3,443,502 | 5/1969 | Harvey | 354/25 |
| 3,618,499 | 11/1971 | Harvey | 354/25 |
| 3,713,371 | 1/1973 | Kurihara et al. | 354/195 |
| 3,720,148 | 3/1973 | Harvey | 354/25 |
| 4,126,871 | 11/1978 | Tamura et al. | 354/25 |

*Primary Examiner*—L. T. Hix
*Assistant Examiner*—Thomas H. Tarcza
*Attorney, Agent, or Firm*—Robert E. Burns; Emmanuel J. Lobato; Bruce L. Adams

[57] ABSTRACT

In an automatic focusing device for a camera lens, a safety device is provided for insuring that the camera lens will be focused when a coincident auto-focusing point signal is not produced. A movable focus adjustment member for focusing the lens has a first cam thereon defining a plurality of focusing positions and a latch mechanism is coactive with the first cam to select a focusing position in response to the receipt of the signal indicating a coincident auto-focusing point. The safety device includes a second cam on the focus adjustment member defining a focusing position corresponding to a predetermined pan focusing distance between zero and infinity and wherein the latching mechanism is coactive with the second cam when the coincident auto-focusing point signal is not produced.

6 Claims, 3 Drawing Figures

4,364,648

SAFETY DEVICE OF AUTO-FOCUSING POINT ADJUSTING CAMERA

BACKGROUND OF THE INVENTION

This invention relates to a safety device for use in a device in which the condition of a coincident focusing point of a camera is electrically detected and a photographing lens is automatically set to a desired coincident focusing point position in reference to the output of the detection.

In a conventional prior art auto-focusing device of a camera, there has already been proposed a system in which the principle of a dual image coincident type distance meter is utilized for producing the coincident focusing point signal when an image is formed by a fixed mirror of on a pair of light receiving elements and an image is formed by a movable mirror which is cooperative with the photographic lens, and thereafter the photographic lens is fixed at a position of the coincident focusing point. In this conventional system, since the image forming signal made by the movable mirror is provided after the photographic lens is started to displace its position by some driving force, such disadvantage has been found as the coincident focusing point signal is not generated either when the contrast in the object to be photographed is extremely low or when a brightness is low and a detection for the focusing point is not possible, resulting is no fixing of the photographing lens and thus said photographic lens is applied to the photographing operation under such condition as the lens is displaced to ∞ or a short distance scale.

SUMMARY OF THE INVENTION

The object of the present invention is to provide an auto-focusing point adjustor device in which the focusing point detecting operation is performed in cooperative relation with a release of a camera, and when a coincident focusing point signal is produced, solenoid means is energized by the signal, a restriction of the position of latching means for engaging with a focusing point adjustor member for use in restricting the amount of feeding of the photographic lens is provided by said solenoid means, the release operation of the camera is continued, said focusing point adjustor member is energized and the feeding of the photographic lens is performed up to a position where the adjustor member is engaged and latched by said latching means. The auto-focusing point adjustor device is provided with a first cam on said focusing point adjustor member controlled by a coincident auto-focusing point signal, a second cam controlled when the coincident auto-focusing point signal is not produced, latching means movable in each of the orbits of the first cam and the second cam for latching said focusing point adjustor member by engaging with said first and second cams, and a solenoid means for controlling a rotational position of said latching means in response to the coincident auto-focusing point signal. The present invention has an object of preventing a photographic miss such arrangement wherein the position of said latching means is restricted by said solenoid means within a range of orbit of said first cam, said latching means is stopped in an orbit of said second cam when the coincident auto-focusing point signal is not produced, said focusing point adjustor member is latched at a photographic distance of about 3 m usually applied in normal photography. That is, the present invention will determine the amount of feeding out of a photographic lens in such a manner as the amount of feeding out of said photographic lens is determined correctly by an auto-focusing point sensing signal when the signal is normally produced, and a photography is performed at a normal focusing distance (e.g. 3 m) which is frequently applied in normal photography and has less failure in photography. Another object of the present invention comprises the provision of indicating means for indicating a photographing distance in cooperation with latching means for latching a focusing point adjustor member for restricting the amount of feeding of a photographic lens by the coincident auto-focusing point signal, a photographing distance is indicated to a photographer before photography is performed, the scale indicated by said indicating means is provided with a distance scale when controlled by the coincident auto-focusing point signal and a distance scale when a coincident auto-focusing point signal is not produced, and further an alarm display is also discriminated positively.

DETAILED DESCRIPTION OF THE INVENTION

Figure 1:
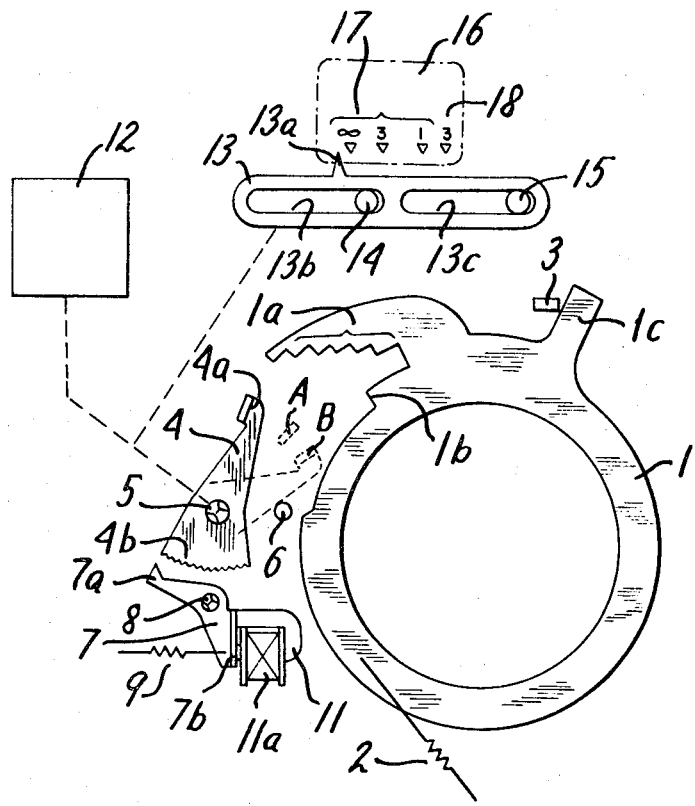
FIG. 1 shows an embodiment of the present invention in which an auto-focusing point adjustor mechanism is set.

Referring now to the drawings, the present invention will now be described in detail.

Figure 2:
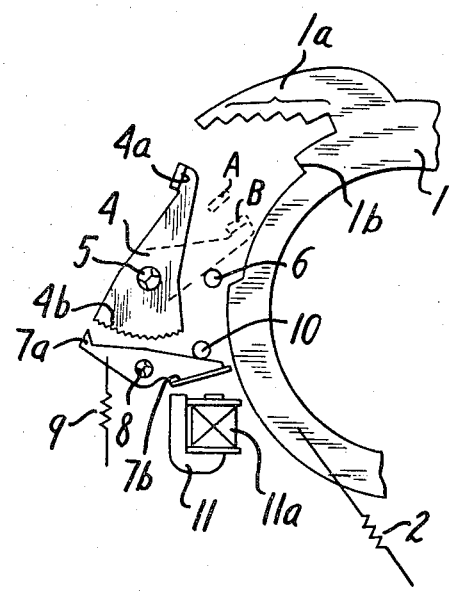
FIG. 2 shows a retractable electromagnet utilized as electromagnetic means.
Figure 3:
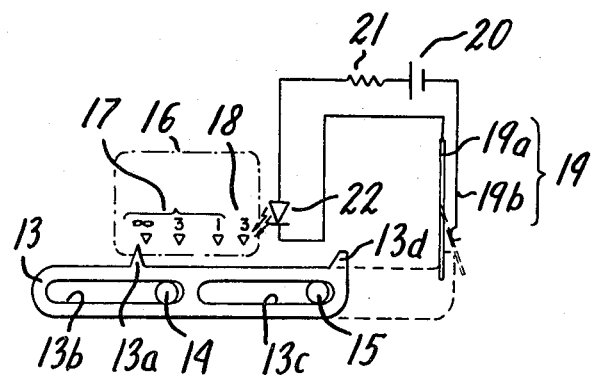
FIG. 3 shows the display part for the photographing distance.

In FIG. 1, a preferred embodiment of the present invention is illustrated in which an auto-focusing point adjustor device is set. In FIG. 2, a preferred embodiment is illustrated in which the solenoid means comprises a retractable electromagnet. In FIG. 3, an example of an alarm is illustrated when the display part of the photographing distance and the coincident focusing point signal are not produced. In FIG. 1, reference numeral 1 indicates a focusing point adjustor member having a first cam 1a, a second cam 1b and a projection 1c. The adjustor member is rotated in a counterclockwise direction by a spring 2 about a center of rotation of the optical axis and has the function of controlling the amount of feeding out of the photographic lens (not illustrated). Reference numeral 3 indicates a set member engaged with the projection 1c of said focussing point adjustor member 1 and setting the focusing point adjustor member 1. Reference numeral 4 shows latch means (hereinafter referred as a latch lever) which is rotated about an axis 5 and positioned in the orbits of the first cam 1a of said focusing point adjustor member 1 and the second cam 1b. The latch means has a raised part 4a engageable with said cams 1a and 1b, and latch teeth 4b. Reference numeral 6 indicates a pin restricting the position of the latch lever 4. Reference numeral 7 is an iron lever which is biased in a clockwise direction by a spring about an axis 8. Energizing current is applied to a coil 11a under the action of the power supply switch (not shown) which normally cooperates with the release of the camera and said iron lever 7 has a retraction part 7 retracted by an engaging electromagnet 11, and a pawl 7a engageable with the latch teeth 4b of the latch lever 4. Reference numeral 12 indicates a movable mirror mechanism which is operated in cooperation with the latch lever 4 connected with a dotted line in the drawing. Reference numeral 13 is an index lever having an index 13a which may be moved in rightward and leftward directions along the longitudinal slots 13b and 13c guided by the pins 14 and 15. The index lever will display photographing distance information in the finder 16 in cooperation with the latch lever 4 as shown by the dotted line. Reference numerals 17 and 18 indicate the photographing distance scales provided in the finder, the scale 17 is a distance scale to be applied when an auto-focusing point sensing mechanism is normally operated and the scale 18 is a distance scale to be applied when brightness is low, contrast of the object to be photographed is low or a focusing point is difficult to sense. In FIG. 2 an example of an arrangement for use in retracting the iron lever 7 and in restricting the position of the latch lever 4 is illustrated wherein an energization may be performed by solenoid means in reference to the coincident focusing point signal. The arrangement is slightly different in its shape from the iron lever 7 shown in FIG. 1. Pin 10 is a pin for use in restricting the position of the iron lever 7. In FIG. 3 an example is illustrated of an alarm display when the display of a photographing distance and a coincident focusing point signal are not produced and similar reference numerals are applied to the same components as indicated in FIG. 1. The index lever 13 is provided with a projection 13d. Reference numeral 19 indicates a switch having contact pieces 19a and 19b. Reference numeral 20 shows a battery, 21 is a resistor and 22 is a luminous diode.

Referring now to FIG. 1, a preferred embodiment of the present invention will be described with respect to its operation. When the release button (not shown) of a camera is depressed, the latch lever 4 is operated in cooperation with the release button to start its clockwise movement about a center of rotation of the axis 5. The movable mirror mechanism 12 is started to operate in cooperation with the movement of the latch lever 4, optical information provided by the object to be photographed is fed to a calculation circuit (not shown) including a pair of light receiving elements, along with optical information provided by a fixed mirror (not shown) and thereafter said information is calculated.

In cooperation with the movement of said latch lever 4, the index lever 13 simultaneously starts to move in the rightward direction in the drawing.

Assuming now that the distance from the camera to the object to be photographed is 1 m, the latch lever 4 is rotated in a clockwise direction in cooperation with the release of the camera, the raised part 4a of said lever 4 continues to move in the orbit of the first cam 1a of the focusing point adjustor member 1 and when the part reaches a position A, the coincident focusing point signal is fed out from said calculation circuit, and an electric current in the coil 11a of the electromagnet 11 which has been energized is cut off.

Deenergization of the electromagnet 11 will cause the iron lever 7 to be rotated in a clockwise direction about the axis 8 by the acting force of the spring 9, the pawl 7a of said iron lever 7 is engaged with the engaging teeth 4b of the latch lever 4 and thereby the latch lever 4 is fixed. Since the latch lever 4 has been fixed, the index 13a of the index lever 13 which cooperates with the latch lever will be stopped while the position of 1 m of the distance scale 17 in the finer 16 is indicated. Further the release operation of the camera is continued and then the set member 3 which has been engaged with the projection 1c of the focusing point adjustor member 1 and used for latching the focusing point adjustor member 1, is moved in a leftward direction in the drawing, the focusing adjustor member 1 is rotated in a counter-clockwise direction by a spring 2 and stopped at a position such that the first cam 1a of the focusing point adjustor member 1 is engaged with the raised part 4a of the latch lever 4 and further the photographic lens is fixed at a photographing distance of 1 m. Keeping the release operation of the camera will make the shutter (not shown) release and then the photographic operation is terminated. The above described arrangement is applied when the coincident focusing point signal is normally obtained. However in the following description, either the condition in which the brightness of the object to be photographed is low or the condition in which the contrast of the object is extremely low and the focusing point sensing operation is not possible will be provided.

The normal condition has been already described in the foregoing paragraphs, so only the portions which are different from that described above will be explained in more detail. The latch lever 4 is rotated in a clockwise direction in cooperation with the release of the camera (not shown), and feeds optical information of the object to be photographed into a calculation circuit (not shown) from the movable mirror mechanism 12 which cooperates with the latch lever. When it is not possible to sense the focusing point, the coincident focusing point signal will not be produced and thus the electric current in the coil 11a of the electromagnet 11 will not be cut resulting in the condition wherein the electromagnet 11 keeps the retraction part 7b of the iron lever 7 retracted. Due to this fact, the latch lever 4 in cooperation with the release of the camera will be rotated in a clockwise direction. The index lever 13 is also moved in a rightward direction in cooperation with the latch lever 4. The raised part 4a of the latch lever 4 is moved from inside the orbit of the first cam of the focusing point adjustor member 1 to a position indicated by B and then further moved into the orbit of the second cam 1b of said focusing point adjustor member 1. At this position, the latch lever 4 is engaged with the pin 6 and then stopped. Assuming that the angle of the second cam part 1b of focusing point adjustor member 1 is set to a value of 3 m, which is generally applied in a normal photographic, as described above, when the coincident focusing point signal is not produced, the latch lever 4 is assumed to be fixed at a photographing distance of 3 m. Even if a non-coincident focusing point signal is found separately in the circuit, the present invention may be easily performed. The index 13a of the index lever 13 which is in cooperative relation with said latch lever 4 is moved from the distance scale 17 to the distance scale 18 and then shows the position thereof. When the distance scales 17 and 18 in the finder 16 are displayed as shown, e.g. the scale 17 is shown by black, and the scale 18 is shown by red, the photographer may confirm the photographing distance by reading the scales prior to his photographing operation and further it is also possible for him to judge if his distance is detected correctly by the auto-focusing mechanism or the focusing point detection is not possible and the normal focusing position (e.g. a photographing distance of 3 m) is applied. That is, this operational feature will provide both a display of the distance and an alarm upon detection or non-detection. As described above, the present invention may be judged as a superior one in which the disadvantage of the prior art mechanism of the camera is completely eliminated, i.e., when the focusing point is not detected and in view of its mechanism, when the photographic lens is set to a position of ∞ or a position of the smallest photographing distance, and after the photographing, the photographing distance is checked.

In FIG. 2 a system is illustrated which is different from the system shown in FIG. 1 in which the electromagnet 11 is deenergized by a coincident focusing point signal to fix the latch lever 4. That is, the system shown in FIG. 2 is made such that the electromagnet 11 is energized by a coincident focusing point signal to retract the retraction part 7b of the iron lever 7 against the spring 9, the engaging tooth 4b of the latch lever 4 is engaged with the pawl 7a of said iron lever 7 and thereby the raised part 4a of said latch lever 4 is stopped in the orbit of the first cam of the focusing point adjustor member 1 and then the focusing point adjustor member 1 is engaged. Also in this arrangement of FIG. 2, when the coincident focusing point signal is not produced, the electromagnet 11 is not energized and thus the same effect as that shown in FIG. 1 having an electromagnet may be provided. Further when no battery charge is found in the camera, the same or similar condition, as no output of the coincident focusing point signal is found, and then a photographic miss on of the film may be remarkably eliminated.

In FIG. 3 a system is illustrated in which the coincident focusing point signal is not produced or the focusing point may not be detected and thus an alarm display is used for showing the former or latter condition. As illustrated in FIG. 1, when the focusing point is not detected and the focusing point adjustor member 1 is fixed at a normal focusing point position of about 3 m, the index lever 13 in cooperation with the latch lever 4 is moved the rightward direction and then this movement is utilized to show an alarm indicating that the focusing point may not be performed. Reference numeral 13d is a projection provided in the index lever 13 which is operated such that when the index lever 13 cooperates with the latch lever 4 shown in FIG. 1 in the case of the impossibility of sensing a focusing point and is moved to a position shown in FIG. 3 by the dotted line, the projection will push the contact piece 19a of the switch 19 to be conductive with the contact piece 19b, and thereby the luminous diode 22 is lit via battery 20 and resistor 21 and shows that the focusing point is not be detected. Such an arrangement will provide a substantial effect or advantage of showing a clear indication of alarm when the brightness of the object to be photographed is low and the sensing of the focusing point may not be performed. In FIG. 3, it is easy to utilize the movement when the latch lever 4 is abutted against the pin 6 in place of the index lever 13 irrespective of the arrangement of the index lever 13 and the operation of the switch 19. It may be preferable to show the photographer that the focusing point may not be detected and a normal focusing point photographing is to be performed (e.g. a distance of 3 m), by applying a buzzer etc. in place of the luminous diode etc.

As is apparent from the foregoing description, only an arrangement of the present invention i.e. a first cam part controlled by the coincident focusing point signal, a second cam part controlled when the coincident focusing point signal is not fed out and means for engaging with each of the cam parts are arranged in the focusing point adjustor member for restricting the amount of focusing the photographic lens, as an embodiment thereof, will provide a superior effect in view of the fact that abnormal operation in the case of the focusing point is not detected is eliminated as a disadvantage of the prior art auto-focusing camera. It will increase the reliability of a camera having an auto-focusing mechanism that distance information may be indicated by a simple mechanism in the optical path of the finder or in such a position as the photographer may easily confirm it and further information may be displayed to the photographer in case of no output of corresponding to the coincident focusing point.

We claim:

1. Safety device for an auto-focusing point adjusting camera comprising a focusing point adjustor member for restricting the amount of focusing of the camera lens in response to a coincident auto-focusing point signal, a first cam arranged on said adjustor member and defining a plurality of focusing positions, a second cam disposed on the adjustor member and defining an intermediate pan focusing position, latching means rotatable in each of the orbits of the first cam and the second cam of said focusing point adjustor member and engaging with said focusing point adjustor member by selectively engaging with said first cam and said second cam, and solenoid means for controlling the rotational position of said latching means in response to the presence and absence of the coincident auto-focusing point signal, and wherein said latching means is rotationally positioned by said solenoid means within a range of orbit of said first cam and outside the orbit of said second cam when the coincident auto-focusing point signal is produced, and when the coincident auto-focusing point signal is not produced, said latching means is rotationally positioned in the orbit of said second cam which effects adjustment of the lens to the pan focusing position.

2. Safety device for an auto-focusing point adjusting camera as set forth in claim (1) further comprising, at either the camera finder or on the outside surface of the camera, a distance scale corresponding to the lens focusing by the presence of the coincident auto-focusing point signal, and a photographing distance scale corresponding to the lens focusing by the absence of the coincident auto-focusing point signal, and index means cooperative with the rotational movement of said latching means to point to one or the other of the scales.

3. Safety device for an auto-focusing point adjusting camera as set forth in claim (2) further comprising alarm means for indicating when the index means is moved to such a position as the photographing distance scale is indicated when the coincident auto-focusing point signal is not present.

4. In an automatic focusing device for a camera lens having a movable focus adjustment member for focusing the lens and having a first cam thereon for defining a plurality of focusing positions, and latching means coactive with the first cam to select a focusing position in response to the receipt of a signal indicating a coincident auto-focusing point, the improvement comprising: a safety device for the automatic focusing device including a second cam on the focus adjustment member defining a pan focusing position corresponding to a predetermined pan focusing distance between zero and infinity; and wherein the latching means includes means coactive with the second cam when the signal indicating a coincident auto-focusing point is not produced to effect positioning of said focus adjustment member in the predetermined pan focusing position.

5. An automatic focusing device according to claim 4; wherein the latching means comprises a rotatable lever and solenoid means for stopping the rotation of the lever such that it is disposed in the selected position for coacting with the first or second cam.

6. An automatic focusing device according to claim 4; further comprising display means for indicating the selected position in a first focusing range when the focusing lever coacts with the first cam and for indicating the predetermined pan focusing distance when the lever coacts with the second cam.

* * * * *